US005936046A

United States Patent [19]
Ghosh

[11] Patent Number: 5,936,046
[45] Date of Patent: Aug. 10, 1999

[54] EPOXY RESIN WITH MONOGLYCIDYL-CAPPED ARYL AMIDOPOLYAMINE

[75] Inventor: Kalyan Ghosh, Richmond, Tex.

[73] Assignee: Shell Oil Company, Houston, Tex.

[21] Appl. No.: 09/002,291

[22] Filed: Dec. 31, 1997

Related U.S. Application Data

[60] Provisional application No. 60/033,957, Dec. 31, 1996.

[51] Int. Cl.$^6$ ............ C08G 59/14; C08G 59/16; C08G 69/44; C08L 63/02
[52] U.S. Cl. ............ 525/449; 525/423; 525/430; 528/341; 528/366
[58] Field of Search ............ 525/430, 423, 525/449; 528/341, 366

[56] References Cited

U.S. PATENT DOCUMENTS

| | | | |
|---|---|---|---|
| 3,034,879 | 5/1962 | Spacht | 44/71 |
| 3,542,728 | 11/1970 | Gersmann et al. | 260/45.85 |
| 3,785,790 | 1/1974 | Strang . | |
| 3,954,964 | 5/1976 | Kuderna, Jr. . | |
| 4,090,971 | 5/1978 | Hoke | 252/51.5 A |
| 4,177,174 | 12/1979 | Hayashi et al. | 528/99 |
| 4,388,426 | 6/1983 | Schure et al. | 523/462 |
| 4,457,800 | 7/1984 | Schure et al. | 523/428 |
| 4,609,691 | 9/1986 | Geist et al. | 523/415 |
| 4,673,765 | 6/1987 | Bertram et al. | 564/155 |
| 5,290,463 | 3/1994 | Habeeb | 252/51.5 A |
| 5,354,789 | 10/1994 | Kamikado | 523/420 |
| 5,770,658 | 6/1998 | Baudoul et al. | 525/504 |

FOREIGN PATENT DOCUMENTS

| | | |
|---|---|---|
| 864953 | 9/1978 | Belgium . |
| 163890 | 11/1975 | Czechoslovakia . |
| 48-78254 | 10/1973 | Japan . |
| 50-117899 | 9/1975 | Japan . |
| 57-105447 | 6/1982 | Japan . |
| 61-172153 | 8/1986 | Japan . |
| 5-271584 | 10/1993 | Japan . |
| 7-207197 | 8/1995 | Japan . |
| 100766 | 11/1978 | Poland . |

*Primary Examiner*—Robert E. Sellers
*Attorney, Agent, or Firm*—Dennis V. Carmen

[57] ABSTRACT

There is provided a curing agent composition for epoxy resins and two component curable epoxy resin compositions. The curing agent is made by reacting at least a b) substituted aryl amidopolyamine with a c) monoglycidyl capping agent, where the substituted aryl amidopolyamine is made by reacting at least:

bi) a phenolic compound substituted with at least one carboxyl group and at least one hydrocarbyl group having at least 1 carbon atom, and bii) an aliphatic polyamine compound having at least two primary amine groups.

The curing agent is storage stable for at least 6 months. There is also provided a two component epoxy resin composition, which advantageously can be made in the absence of external catalysts/accelerators, and can cure within 24 hours at the low temperature of 4.4° C. The two component epoxy resin composition also exhibits excellent compatibility between the curing agent and the epoxy resin, thus reducing or eliminating the need for an induction time.

13 Claims, No Drawings

5,936,046

EPOXY RESIN WITH MONOGLYCIDYL-CAPPED ARYL AMIDOPOLYAMINE

This application claims the benefit of U.S. Provisional Application No. 60/033,957, filed Dec. 31, 1996, the entire disclosure of which is hereby incorporated by reference.

1. FIELD OF THE INVENTION

This invention is related to a storage stable curing agent composition for epoxy resins, and to two component solventborne or solventless systems having enhanced compatibility between the epoxy resin and the curing agent, which are rapidly heat curable at ambient and sub-ambient temperatures in the absence of external catalysts/accelerators. The invention is also directed to methods of application and manufacture, as well as to the cured products made thereby.

2. BACKGROUND OF THE ART

There has long been a desire to formulate a curing agent which is simultaneously storage stable, is immediately compatible with conventional epoxy resins, and is sufficiently reactive with epoxy resins that the system will cure in a wide range of temperatures, even as low as 4.4° C., within a 24 hour period in the absence of external accelerators if possible. Typical amine curing agents have primary amine groups, and stored or used in low temperature curing conditions or in high humidity environments, produce in the final cured product the undesired side effect of blooming or hazing. This phenomena is thought to result from the reaction between the highly reactive primary amine groups with atmospheric carbon dioxide and moisture to produce carbamates, resulting in scission of the curing agent polymer chain. Another problem that can occur with conventional primary amine curing agents in storage is that they may oligomerize, especially in hot environments. Thus, many amine curing agents have a problem with storage stability. To some extent, this problem can be ameliorated by reacting out many of the primary amine hydrogens. The drawback to this approach in the past has been that the reactivity of the curing agent was impaired because secondary amines are less reactive that the primary amines, such that accelerators had to be used to obtain adequate cure times, especially at low curing temperatures. Furthermore, many of the amine curing agent adducts formed to eliminate the presence of primary amine groups are poorly compatible with the epoxy resin such that induction times of 10 minutes to two hours were needed to compatibilize the epoxy resin composition with the curing agent composition.

It would be desirable to have a curing agent composition which is storage stable yet reactive enough to cure epoxy resins without external catalysts/accelerators in a wide range of curing temperatures and which can be applied to a substrate immediately upon mixing with the epoxy resin rather than waiting for an induction time to compatibilize the two components.

3. SUMMARY OF THE INVENTION

There is provided a curing agent composition, a method for making a curing agent composition, two component curable epoxy resin compositions and methods of their application, and the different cured products thereof. The curing agent comprises the reaction product of a b) substituted aryl amidopolyamine with a c) monoglycidyl capping agent, where the substituted aryl amidopolyamine comprises the reaction product of:

bi) a phenolic compound substituted with at least one carboxyl group and at least one hydrocarbyl group having at least 1 carbon atom, and bii) an aliphatic polyamine compound having at least two primary amine groups.

The bi) a phenolic compound is preferably substituted with at least one carboxyl group and at least one hydrocarbyl group having more than 12 carbon atoms, and the bii) aliphatic polyamine compound preferably has at least two primary amine groups and a secondary amine group.

There is also provided a two component epoxy resin composition comprising an epoxy resin component and the above described curing agent component. Preferably, the two component epoxy resin composition is in the absence of external catalysts/accelerators, and can cure within 24 hours at 4.4° C.

4. DETAILED DESCRIPTION OF THE INVENTION

The curing agents of the invention have the advantage of curing epoxy resins within 24 hours at temperatures as low as 4.4° C. in the absence of external accelerators or catalysts. While not being limited to a theory, it is believed that the compositions can self cure without external accelerators even at low temperatures, because the curing agent adduct contains phenolic hydroxyl groups, which self catalyze reactions between the epoxy resins and the amine nitrogens. Yet, quite unexpectedly, storage stability tests revealed that the amine curing agent retained a substantially constant viscosity over a 6 month period, which is a good indicator that the phenolic hydroxyl groups and amine hydrogens on the curing agent molecules did not autocatalyze with each other and oligomerize, and did not cleave through carbamate formation, leading to the retention of its curing reactivity.

The curing agents also have the advantage of enhanced compatibility with epoxy resins as evidenced by clear draw down films as soon as the epoxy resin and the curing agent components are mixed together and drawn. This enhanced compatibility leads to very short, or the complete elimination of, induction times. Typical epoxy resin compositions need an induction period ranging from 15 minutes to 1 hour to compatibilize the epoxy and curing agent components prior to curing. The curing agents of the invention, however, can be mixed with the epoxy resin and immediately cured without waiting for an induction period to compatibilize the components.

The curing agent is made by reacting a b) substituted aryl amidopolyamine with a c) monoglycidyl capping agent. The substituted aryl amidopolyamine is made by reacting a bi) phenolic compound substituted with at least one carboxyl group and at least one hydrocarbyl group having at least 1, and preferably 8 or more, more preferably greater than 12, most preferably 14 or more carbon atoms, and bii) an aliphatic polyamine compound having at least two primary amine groups.

In one embodiment, the curing agent composition is represented by the following structural formula:

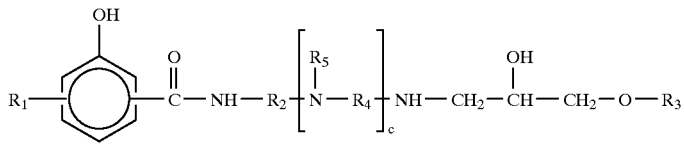

wherein $R_1$ is a branched or unbranched, substituted or unsubstituted, monovalent hydrocarbyl group having at least one carbon atom; $R_2$ and $R_4$ each independently represent a branched or unbranched, substituted or unsubstituted, divalent hydrocarbyl group having 2–24 carbon atoms, or

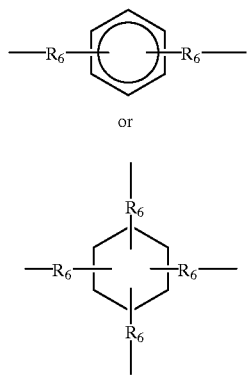

wherein $R_6$ represents a branched or unbranched, substituted or unsubstituted, divalent hydrocarbyl group having 2–24 carbon atoms; $R_3$ is a branched or unbranched, substituted or unsubstituted, monovalent hydrocarbyl having 1–24 carbon atoms, a polyoxyalkylene group, an aryl group, an alkaryl group, or an aralkyl group; $R_5$ is hydrogen or a branched or unbranched, substituted or unsubstituted, monovalent hydrocarbyl having 1–24 carbon atoms; and c represents an integer from 0–10.

Turning to the individual reactant molecules, the structure of the phenolic compound is an aromatic ring to which is covalently bonded at least one hydroxyl group, at least one hydrocarbyl group, and at least one carboxyl group. Usually and preferably, the structure of the phenolic compound will contain only one hydroxyl group and one carboxyl group bonded to the aromatic ring. However, it is rare if not impossible to commercially acquire a phenolic compound which is so pure that it contains only one species. Commercially available phenolic compounds usually contain a mixture of species, such as mono and di carboxyl substituted phenolics. Thus, while the preferable embodiment is one in which the phenolic compound contains only one of each group bonded to the aromatic ring, this embodiment includes a phenolic which contains a mixture of species in which the predominant (>70 mole percent) species has only one carboxyl group and one hydroxyl group bonded to the aromatic ring.

One of the substituents on the aromatic ring of the phenolic compound is the hydrocarbyl group. While the hydrocarbyl group can comprise a wide variety of structures and atoms, it must have a predominantly hydrocarbon character. Included within the meaning of a hydrocarbyl group are the alkyl or alkenyl groups, the aliphatic substituted aromatic or alicyclics, or the aromatic or alicyclic substituted alkyls or alkenyls. Each of these groups may be branched or unbranched. The phenolic compound preferably contains at least 50 mole % species which have only one hydrocarbyl substituent.

The substituent on the substituted aryl amidopolyamine is at least one hydrocarbyl group having at least one carbon atom. Longer chain hydrocarbyl groups are preferred. All else remaining equal, a curing agent having longer chain hydrocarbyl substituents, i.e. 8 or more, preferably greater than 12, and most preferably 14 or more, tend to be more hydrophobic than the curing agents having short chain hydrocarbyl groups on the order of 1–7 carbon atoms. In many applications, the hydrophobic character of the hydrocarbyl substituent is desirable to improve the compatibility of the curing agent with the epoxy resin component. Further, long chain hydrocarbyl substituents are somewhat more flexible than their shorter chain counterparts, thus lowering the glass transition temperature of the curing agent. It is desirable to have a curing agent with a lowered glass transition temperature to improve its flow properties in low temperature curing conditions. Thus, the most preferred hydrocarbyl groups are those having 14 or more carbon atoms. Although there is no particular upper limit on number of carbon atoms, the most common number of carbon atoms used within this invention will be 14–24, more typically from 14–18, although hydrocarbons with up to 36 carbon atoms are also available.

Of the types of hydrocarbyl substituents, the alkyls are preferred. These can be branched or unbranched, preferably unbranched or having no more than 1 branch per 6 backbone carbon atoms. Examples of alkyl substituents having at least about 8 carbon atoms include octyl, nonyl, decyl, isodecyl, dodecyl, pentadecyl, eicosyl, triacontyl and the like, as well as radicals derived from substantially saturated petroleum fractions, olefin polymers and highly refined white oils or synthetic alkanes.

Other types of hydrocarbyl groups which are suitable include substituted hydrocarbyl groups; that is, groups containing non-hydrocarbon substituents which do not alter the predominantly hydrocarbon character of the group. Examples are halo, nitro, cyano, ether, carbonyl, and sulfonyl groups. Also included are hetero atoms which are atoms other than carbon present within a chain or ring otherwise composed of carbon atoms. Suitable hetero atoms include, for example, nitrogen, oxygen, and sulfur. Further included within the meaning of the hydrocarbyl group are the alkoxy compounds.

Preferably, no more than an average of one substituent or hetero atom will be present for each 10 carbon atoms in the hydrocarbyl group, and most preferably, the hydrocarbyl group does not contain any hetero atoms or substituents.

The substituted aryl amidopolyamines may contain more than one hydrocarbyl substituent on the aromatic ring of the phenolic compound. The dihydrocarbyl substituted aryl amidopolyamines may have a long chain hydrocarbyl of 14 or more carbon atoms and a short chain hydrocarbyl of 1–4 carbon atoms attached to the aromatic ring of the phenolic compound, or both of the hydrocarbyls may be long chain. As noted above, however, preferably greater than 50 mole % of the species contain only one hydrocarbyl substituent.

The phenols on which the hydrocarbyl and carboxyl groups are situated are aromatic compounds containing at least one, and preferably one, hydroxyl group. Examples are phenol, α- or β-naphthols, resorcinol, hydroquinone, 4,4'-dioxydiphenyl, 4,4'-dioxydiphenylether, 4,4'-dioxydiphenylsulfone, 4,4'-dioxydiphenylmethane, the condensation products of phenol and formaldehyde known as novolacs, and bis(4-hydroxyphenyl)alkyls or ethers or sulfones optionally substituted with alkyl groups on the aromatic rings. Phenol is preferred.

To substitute the hydroxyl aromatic compound with the hydrocarbyl group, a hydrocarbon-based compound of the hydrocarbyl group as mentioned above is reacted with the hydroxyl aromatic compound at a temperature of about 50°–200° C. in the presence of a suitable catalyst such as aluminum chloride, boron trifluoride or zinc chloride.

The phenolic compound also contains at least one carboxyl group as a substituent, and preferably only one carboxyl group per aromatic ring. The carboxyl group is bonded directly to the aromatic phenolic ring, or indirectly to the ring through an aliphatic chain. Preferred, however, is a carboxyl group bonded directly to the aromatic ring of the phenolic compound at the ortho or para positions to the phenolic hydroxyl group. Further, within the meaning of a carboxyl group are the alkyl esters and anhydrides of the carboxyl substituents.

Examples of the carboxyl groups bonded to the phenolic aromatic ring are those derived from carboxylic acids containing 0–24 carbon atoms, not counting the carboxylic acid carbon. The carboxylic acids from which the substituents are derived include -formic acid (a -carboxy acid), -acetic acid, -proprionic acid, or -stearic acid substituents. A particularly preferred carboxyl group is a carboxy acid in view of its high reactivity with amines.

The phenolic compound containing the carboxyl and the hydrocarbyl groups can be prepared by methods which are known in the art as the "Kolbe-Schmitt reaction," which comprises reacting a salt, preferably an alkali metal salt, of the hydrocarbyl substituted phenol with carbon dioxide and subsequently acidifying the salt thus obtained. The conditions of the carbonation reaction are likewise well known to those skilled in the art. It may be carried out at atmospheric or superatmospheric pressure in a substantially inert, nonpolar liquid diluent.

A particularly preferred phenolic compound is a hydrocarbyl substituted salicyclic acid. This phenolic compound is a good building block toward producing a curing agent which has good flow, reactivity, and compatibility with epoxy resins at low cure temperatures in the absence of external accelerators/catalysts, and a good balance of mechanical properties and water, corrosion and humidity resistance properties.

In a more preferred embodiment, the phenolic compound used in the invention is a salicyclic acid substituted with a 14–18 linear carbon alkyl group located at the o- or p-position to the phenolic hydroxyl group. The preparation of alkyl substituted salicyclic acids is described in U.S. Pat. No. 3,013,868, incorporated herein by reference in its entirety.

To manufacture the substituted aryl amidopolyamine, the phenolic compound described above is reacted with an aliphatic polyamine compound having at least two primary amine groups at an elevated temperature, suitably at a temperature of from about 150° C. to about 160° C. for a time sufficient to substantially complete the reaction, usually from about 4 to about 12 hours. The ingredients can be mixed together and reacted, but preferably, the phenolic compound should be added to the polyamine compound so as to reduce the possibility of reacting both of the primary amine groups on the polyamine compound with the phenolic compound. This reaction may be carried out in the presence of absence of solvents or catalysts, typically in the presence of a solvent and in the absence of a catalyst. If a catalyst is employed, one could use triphenylphosphite. It is advisable not to let the reaction temperature rise too much above 170° C. for an extended period of time in order to avoid de-carboxylating the phenolic compound and the resultant production of free phenolic compounds in the reaction mixture. To drive the reaction to completion, vacuum may be applied during the course of the reaction or towards the tail end of the reaction.

Preferably, at least one primary nitrogen group equivalent of polyamine is reacted per carboxyl group equivalent on the phenolic compound, and more preferably the polyamine is reacted with the phenolic compound at a molar excess, such as at a molar ratio of 1.25:1 or more, in order to react out the all the carboxyl groups to form amide groups wherever carboxyl groups appear on the phenolic compound. While molar ratios of less than 1:1 are tolerable, the object of providing a reactive curing agent at low temperature cure conditions which is storage stable and compatible with epoxy resins is best achieved if an molar equivalent or excess of the polyamine is used. Once the amine reaction onto the phenolic compound and the reaction is complete, the excess amine, if any, should be vacuum distilled off, typically at 20 in. Hg to 30 in. Hg for 30 to 480 minutes.

Other groups related to the amide group formed by the reaction between the carboxyl group and the polyamine that are within the meaning of the term amide include the imides and the amidines.

The aliphatic polyamines useful for the manufacture of the aryl amidpolyamines are those which have at lease two primary amine groups, one primary amine group used for reaction with the carboxyl group on phenolic compound, the other primary amine available for reaction with the monoglycidyl compound. Examples of polyamines useful in the practice of the invention are those represented by the formula:

wherein n is an average of integers between about 0 and 10, preferably between 1 and 4; and X is a divalent branched or unbranched hydrocarbon radical having about 1–18 carbons, one or more aryl or alkaryl groups, or one or more alicyclic groups. Preferably, X is a lower alkylene radical having 1–10, preferably 2–6, carbon atoms. Such alkylene polyamines include methylene polyamines, ethylene polyamines, butylene polyamines, propylene polyamines, pentylene polyamines, hexylene polyamines, heptylene polyamines, etc. The higher homologs of such amines and related aminoalkyl-substituted piperazines are also included. Specific examples of such polyamines include ethylene diamine, triethylene tetramine, tris(2-aminoethyl)-amine, 1,2- and 1,3-propylene diamine, trimethylene diamine, 1,2- and 1,4-butanediamine, hexamethylene diamine, decamethylene diamine, octamethylene diamine, diethylene triamine, triethylene tetramine, di(heptamethylene)triamine, tripropylene tetramine, tetraethylene pentamine, trimethylene diamine, pentaethylenehexamine, di(trimethylene)triamine, p- and m-xylylene diamine, methylene dianiline, 2,4-toluenediamine, 2,6-toluenediamine, polymethylene polyphenylpolyamine, and mixtures thereof. Higher homologs, obtained by condensing two or more of the above-illustrated alkylene amines, are also useful. More preferred are those polyamines containing at least one secondary amino group in addition to the at least two primary amino groups, and multiple divalent hydrocarbon radicals having 2–4 carbon atoms.

The ethylene type polyamines, examples of which are mentioned above, are especially useful for reasons of cost and effectiveness. Such polyamines are described in detail under the heading "Diamines and Higher Amines" in Kirk-Othmer, Encyclopedia of Chemical Technology, Second Edition, Vol. 7, pp. 22–39. They are prepared most conveniently by the reaction of an alkylene chloride with ammonia or by reaction of an ethylene imine with a ring-opening reagent such as ammonia. These reactions result in the production of the somewhat complex mixtures of alkylene polyamines, including cyclic condensation products such as piperazines. These mixtures are satisfactory in preparing the compositions of this invention.

Hydroxy polyamines, e.g., alkylene polyamines having one or more hydroxyalkyl substituents on the nitrogen atoms, are also useful in preparing amides of this invention. Preferred hydroxyalkyl-substituted alkylene polyamines are those in which the hydroxyalkyl group has less than about 10 carbon atoms. Examples of such hydroxyalkyl-substituted polyamines include N-(2-hydroxyethyl)-ethylenediamine, N,N'-bis(2-hydroxyethyl)ethylenediamine, monohydroxypropyl-substituted diethylene triamine, dihydroxypropyltetraethylenepentamine and N-(3-hydroxybutyl)tetramethylenediamine. Higher homologs obtained by condensation of the above-illustrated hydroxyalkyl-substituted alkylene amines through amino radicals or through hydroxy radicals are likewise useful.

Other types of polyamines which are useful include those in which one of the above described polyamines are reacted in stoichiometric excess with polyepoxide compounds or polycarboxylic acids to produce a primary amine terminated amine adduct having either aminealkyl hydroxy linkages or amide linkages along the adduct chain. This primary amine terminated polyamine adduct can then be used to react with the phenolic compound described above.

The monoglycidyl capping agent can be an aliphatic, alicyclic, or aromatic compound attached to a monoglycidyl functional group. Non-limiting examples of monoglycidyl capping agents which are suitable for use in the invention include:

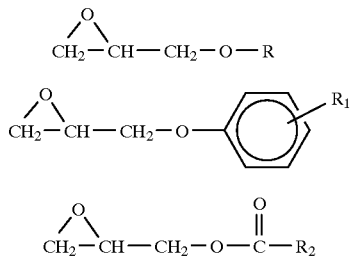

wherein R and $R_2$ are the same or different and are a branched or linear alkyl, an alkalicyclic, polyoxyalkyl, or alkenyl group having 2–100 carbon atoms, optionally branched; and $R_1$ is hydrogen or a branched or unbranched alkyl having 1–18 carbon atoms. There may be more than one type of $R_1$ group attached to the aromatic ring.

These categories would include the unsaturated epoxy hydrocarbons of butylene, cyclohexene, styrene oxide and the like; epoxy ethers of monovalent alcohols such as methyl, ethyl, butyl, 2-ethylhexyl, dodecyl alcohol and others; epoxides of the alkylene oxide adducts of alcohols having at least 8 carbon atoms by the sequential addition of alkylene oxide to the corresponding alkanol (ROH), such as those marketed under the Neodol® name; epoxy ethers of monovalent phenols such as phenol, cresol, and other phenols substituted in the o- or p-positions with $C_1$–$C_{21}$ branched or unbranched alkyl, aralkyl, alkaryl, or alkoxy groups such as nonylphenol; glycidyl esters of monocarboxylic acids such as the glycidyl ester of caprylic acid, the glycidyl ester of capric acid, the glycidyl ester of lauric acid, the glycidyl ester of stearic acid, the glycidyl ester of arachidic acid and the glycidyl esters of alpha, alpha-dialkyl monocarboxylic acids described in U.S. Pat. No. 3,178,454, hereby incorporated by reference; epoxy esters of unsaturated alcohols or unsaturated carboxylic acids such as the glycidyl ester of neodecanoic acid, epoxidized methyl oleate, epoxidized n-butyl oleate, epoxidized methyl palmitoleate, epoxidized ethyl linoleate and the like; phenyl glycidyl ether; allyl glycidyl ethers, and acetals of glycidaldehyde.

Specific examples of monoglycidyl capping agents useful to the practice of the invention include alkyl glycidyl ethers with 1–18 linear carbon atoms in the alkyl chain such as butyl glycidyl ether or a mixture of $C_8$–$C_{14}$ alkyls, cresyl glycidyl ether, phenyl glycidyl ether, nonylphenylglycidyl ether, p-tert-butylphenyl glycidyl ether, 2-ethylhexyl glycidyl ether, and the glycidyl ester of neodecanoic acid.

The aliphatic based capping agents are usually hydrophobic in character, which tends to improve the flow properties of the epoxy-curing agent mixture at low temperatures, and tends to lower the glass transition temperature of the film or coating. The lower glass transition temperature improves the impact strength of the cured film. Aromatic based monoglycidyl capping agents, however, have the advantage of rendering the cured film more rigid, chemically resistant, and resistant to stresses at high temperatures. Any one of these types of capping agents may be used, and mixtures thereof are also advantageous to attain an overall balance of mechanical strength and chemical resistance.

The capping agent is reacted with the amidopolyamine compound in an amount effective to render the curing agent storage stable for 6 months and compatible with bisphenol A and bisphenol F type liquid diglycidyl ether epoxy resins as well as epoxidized phenolic novolac resins. Usually, the monoglycidyl capping agent is reacted with the amidopolyamine compound at a molar ratio of 0.5:1 to 2:1. While one can go much higher than a 2:1 ratio, it is not necessary to do so in order to convert the primary amine groups into secondary amine groups. Further, the curing agent can be only partially capped with the monoglycidyl capping agent, because even a partial capping will have some effect on blush reduction and increasing storage stability.

In addition to reducing the effect of blushing by reacting out some or all of the primary amine groups on the amidopolyamine, reacting the amidopolyamine with a monoglycidyl functional group has the advantage of leaving the one free amine hydrogen active for reaction with epoxy groups. It is desirable to avoid reacting the amidopolyamine with functional groups which would yield the structure —NH—CO—, since the carboxy group tends to deactivate the amine hydrogen. Reacting the primary amine on the amidopolyamine compound with a glycidyl functionality, however, leaves the secondary amine hydrogen more active for reaction with an epoxy resin. Thus, one can achieve the dual advantage of reducing blush without destroying the reactivity of the curing agent toward the epoxy resin.

As to the order of reaction, it is desired to first make the amidopolyamine compound followed by reaction with the monoglycidyl capping agent to ensure that the polyamine compounds react onto the phenolic compounds. Reacting all ingredients together in situ would result in competing reactions where monoglycidyl functionalities undesirably react with the acid groups on the phenolic compound or with both primary amine functionalities on the polyamine compound, thereby effectively reducing the number of species having amidopolyamine linkages between the phenolic compound and the polyamine compound, end capped with the monoglycidyl capping agent.

The curing agents of the invention can optionally be mixed with other conventional curing agents. The amount of other conventional curing agents mixed in will depend upon the requirements placed upon the end product and the efficiencies one desires to achieve. If the end use does not require a product which has high end physical properties and/or it is not important to have lowered processing times, and/or the product is not stored for lengthy time periods, then greater amount of an inexpensive conventional curing agent can be mixed with the curing agent composition of the invention. The amount of the curing agent of the invention can range in the low end of from 1 to 50 wt. % based on the weight of all curing agents, but is preferably from 50 wt % to 100 wt. %.

Conventional curing agents are usually polyamines with at least 2 nitrogen atoms per molecule and at least two reactive amine hydrogen atoms per molecule. The nitrogen atoms are linked by divalent hydrocarbyl groups. Other hydrocarbyl groups such as aliphatic, cycloaliphatic or aromatic groups may also be singly linked to some of the nitrogen atoms. These polyamines contain at least 2 carbon atoms per molecule. Preferably polyamines contain about 2 to about 6 amine nitrogen atoms per molecule, 2 to about 8 amine hydrogen atoms per molecule, and 2 to about 50 carbon atoms.

Examples of the polyamines useful as conventional curing agents for epoxy resins include aliphatic polyamines such as ethylene diamine, diethylene triamine, triethylene tetramine, tetraethylene pentamine, pentaethylene hexamine, dipropylene triamine, tributylene tetramine, hexamethylene diamine, dihexamethylene triamine, 1,2-propane diamine, 1,3-propane diamine, 1,2-butane diamine, 1,3-butane diamine, 1,4-butane diamine, 1,5-pentane diamine, 1,6-hexane diamine, 2-methyl-1,5-pentanediamine, 2,5-dimethyl-2,5-hexanediamine and the like; cycloaliphatic polyamines such as isophoronediamine, 4,4'-diaminodicyclohexylmethane, menthane diamine, 1,2-diaminocyclohexane, 1,4-diaminocyclohexane, and diamines derived from "dimer acids" (dimerized fatty acids) which are produced by condensing the dimer acids with ammonia and then dehydrating and hydrogenating; adducts of amines with epoxy resins such as an adduct of isophoronediamine with a diglycidyl ether of a dihydric phenol, or corresponding adducts with ethylenediamine or m-xylylenediamine; araliphatic polyamines such as 1,3-bis(aminomethyl)benzene; aromatic polyamines such as 4,4'-methylenedianiline, 1,3-phenylenediamine and 3,5-diethyl-2,4-toluenediamine; amidoamines such as condensates of fatty acids with diethylenetriamine, triethylenetetramine, etc; and polyamides such as condensates of dimer acids with diethylenetriamine, triethylenetetramine, etc. Some commercial examples of polyamines include EPI-CURE® Curing Agent 3140 (a dimer acid-aliphatic polyamine adduct), EPI-CURE® Curing Agent 3270 (a modified aliphatic polyamine), EPI-CURE® Curing Agent 3274 (a modified aliphatic polyamine), EPI-CURE® Curing Agent 3295 (an aliphatic amine adduct), EPI-CURE® Curing Agent 3282 (an aliphatic amine adduct), EPI-CURE® Curing Agent 3055 (an amidopolyamine), EPI-CURE® Curing Agent 3046 (an amidopolyamine) and EPI-CURE® Curing Agent 3072 (modified amidoamine), and EPI-CURE® Curing Agent 3483 (an aromatic polyamine) available from Shell Chemical Company. Mixtures of polyamines can also be used.

The epoxy resin component has at least one 1,2-epoxy group per molecule. Mixtures of epoxy compounds having one epoxy functionality and two or more epoxy groups are also suitable. The epoxy compounds having two or more epoxy groups per molecule means that the nominal functionality is two or more. Generally epoxy resins contain a distribution of compounds with a varying number of 1,2-epoxy equivalency. The actual average functionality of these epoxy compounds is about 1.5 or more. Any of the epoxy compounds can be saturated or unsaturated, linear or branched, aliphatic, cycloaliphatic, aromatic or heterocyclic, and may bear substituents. Such substituents can include bromine or fluorine. They may be monomeric or polymeric, liquid or solid, but are preferably liquid or a low melting solid at room temperature.

The epoxy compounds can be of the glycidyl ether type prepared by reacting epichlorohydrin with a compound containing at least one aromatic hydroxyl group carried out under alkaline reaction conditions. Examples of other epoxy resins suitable for use in the invention include diglycidyl ethers of dihydric compounds, epoxy novolacs and cycloaliphatic epoxies.

Preferred epoxy resins include, but are not limited to, any one of those represented by the formulas:

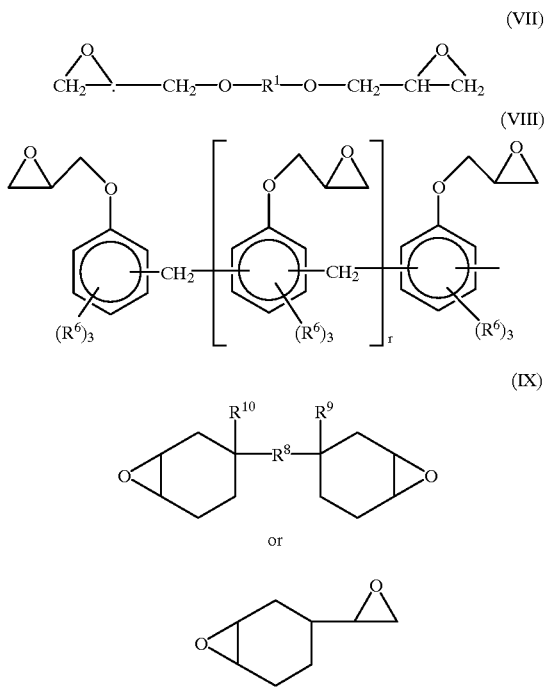

wherein r is a real number from about 0 to about 6, $R^1$ is a divalent aliphatic group, a divalent cycloaliphatic group, a divalent aryl group, or a divalent arylaliphatic group, $R_6$ is independently a hydrogen or a $C_1$–$C_{10}$ alkyl group, $R_8$ is a divalent aliphatic group optionally containing ether or ester group(s) or together with $R^9$ or $R^{10}$ form a spiro ring optionally containing heteroatoms, and $R^9$ and $R^{10}$ are independently hydrogen or $R^9$ or $R^{10}$ together with $R^8$ form a Spiro ring optionally containing heteroatoms such as oxygen.

$R^1$ can be a divalent cycloaliphatic group having the formula:

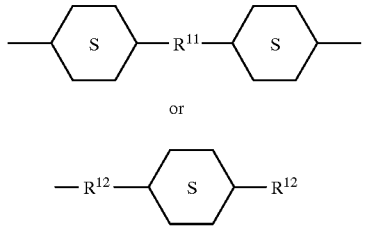

or

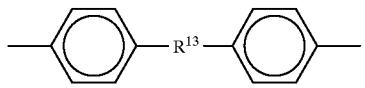

wherein $R^{11}$ and $R^{12}$ are each independently an alkylene group, or a divalent arylaliphatic group having the formula

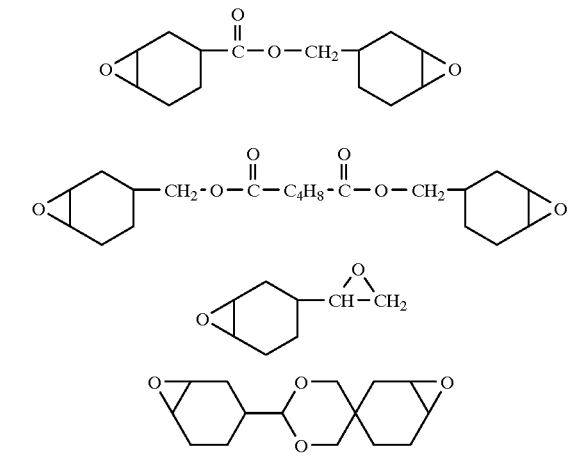

wherein $R^{13}$ is an alkylene group.

For the epoxy compound having a nominal functionality of two or more, the epoxy compound is preferably a diglycidyl ether of a dihydric phenol, diglycidyl ether of a hydrogenated dihydric phenol, an aliphatic glycidyl ether, epoxy novolac or a cycloaliphatic epoxy.

Diglycidyl ethers of dihydric phenols can be produced, for example, by reacting an epihalohydrin with a dihydric phenol in the presence of an alkali. Examples of suitable dihydric phenols include: 2,2-bis(4-hydroxyphenyl) propane (bisphenol-A); 2,2-bis(4-hydroxy-3-tert-butylphenyl) propane; 1,1-bis(4-hydroxyphenyl) ethane; 1,1-bis(4-hydroxyphenyl) isobutane; bis(2-hydroxy-1-naphthyl) methane; 1,5-dihydroxynaphthalene; 1,1-bis(4-hydroxy-3-alkylphenyl) ethane and the like. Suitable dihydric phenols can also be obtained from the reaction of phenol with aldehydes such as formaldehyde (bisphenol-F). Diglycidyl ethers of dihydric phenols includes advancement products of the above diglycidyl ethers of dihydric phenols with phenolic compounds such as bisphenol-A, such as those described in U.S. Pat. Nos. 3,477,990 and 4,734,468.

Diglycidyl ethers of hydrogenated dihydric phenols can be produced, for example, by hydrogenation of dihydric phenols followed by glycidation with epihalohydrin in the presence of a Lewis acid catalyst and subsequent formation of the glycidyl ether by reaction with sodium hydroxide. Examples of suitable dihydric phenols are listed above.

Aliphatic glycidyl ethers can be produced, for example, by reacting an epihalohydrin with an aliphatic diol in the presence of a Lewis acid catalyst followed by conversion of the halohydrin intermediate to the glycidyl ether by reaction with sodium hydroxide. Examples of suitable aliphatic glycidyl ethers include for example, diglycidyl ethers of 1,4 butanediol, neopentyl glycol, cyclohexane dimethanol, hexanediol, polypropylene glycol, and like diols and glycols; and triglycidyl ethers of trimethylol ethane and trimethylol propane. Epoxy novolacs can be produced by condensation of formaldehyde and a phenol followed by glycidation by epihalohydrin in the presence of an alkali. The phenol can be for example, phenol, cresol, nonylphenol and t-butylphenol. Cycloaliphatic epoxies can be produced by epoxidizing a cycloalkene-containing compound with greater than one olefinic bond with peracetic acid. Examples of cycloaliphatic epoxies include, for example, 3,4-epoxycyclo-hexylmethyl-(3,4-epoxy) cyclohexanecarboxylate, dicycloaliphatic diether diepoxy [2-(3,4-epoxy)cyclohexyl-5,5-spiro(3,4-epoxy)-cyclohexane-m-dioxane], bis(3,4-epoxycyclohexylmethyl) adipate, bis(3,4-epoxycyclohexyl)adipate and vinylcyclohexene dioxide [4-(1,2-epoxyethyl)-1,2-epoxycyclohexane]. Cycloaliphatic epoxies include compounds of the formulas:

Commercial examples of the preferred epoxy compounds having a nominal functionality of two or more include, for example, EPON® Resins DPL-862, 828, 826, 825, 1001, EPONEX® Resin 1510, HELOXY® Modifiers 107, 67, 68, and 32; all available from Shell Chemical Company and Union Carbide Epoxy Resins ERL-4221, -4289, -4299, -4234 and -4206.

The storage stable composition of the invention may include other additives, such as fillers, elastomers, stabilizers, extenders, plasticizers, accelerators, pigments, reinforcing agents, flow control agents and flame retardants depending on the application.

Advantageously, the curable epoxy resin composition is cured in the absence of catalyst compounds which accelerate the reaction between the curing agent and the epoxy resin, commonly known as accelerators. An accelerator, however, can be included, if desired, to increase the cure rate of the epoxy resin-curing agent system beyond that already achieved in its absence. Various amine-compatible accelerators can be used as long as they are soluble in the amine curing agents. Examples of accelerators include metal salts such as, for example, sulfonates, phosphonates, sulfates, tetrafluoroborates, carboxylates and nitrates of Groups IA, IIA and transition metal series of the Periodic Table (CAS version), preferably Mg, Ca, Zn and Sn salts, and complexes thereof; inorganic acids such as, for example, $HBF_4$, $H_2SO_4$, $H_2NSO_3H$ and $H_3PO_4$; carboxylic acids, preferably hydroxy-substituted carboxylic acids such as, for example, salicylic, lactic, glycolic and resorcylic; phenolic compounds such as, for example, phenol, t-butylphenol, nonylphenol and bisphenol A; imidazoles; cyanamide compounds such as dicyandiamide and cyanamide; sulfonamides such as, for example p-toluenesulfonamide, methanesulfonamide, N-methylbenzenesulfonamide and sulfamide; and imides such as, for example, phthalimide, succinimide, perylenetetracarboxylicdiimide and saccharin.

When the cure rate at the desired temperature is suboptimal, it is sometimes desirable to include the accelerator. For example, for adhesive applications and civil engineering applications where application at low temperature is desired, it may be desirable to include the accelerator. The accelerators are typically present in an amount of from about 0.1 weight percent to about 10 weight percent, preferably to 5 weight percent, based on the epoxy resin, if used at all.

For coating applications, the curable epoxy resin composition can also contain pigments of the conventional type such as iron oxides, lead oxides, strontium chromate, carbon black, titanium dioxide, talc, barium sulfate, phthalocyanine blue and green, cadmium red, iron blue, chromic green, lead silicate, silica, silicates and the like. Such pigments can be added to the polyamine curing agent component or the epoxy resin component prior to mixing them together. Their amounts usually range from 20 to 100 pbw based on the weight of the epoxy resin and the curing agent composition.

For floor topping application, the curable epoxy resin composition can also contain a filler such as sand, other siliceous materials, iron or other metals. Small amounts of thixotropic agents, coloring agents, inert plasticizers, and leveling agents can also be incorporated in the curable epoxy resin composition if desired. These curable flooring compositions can be trowelled, sprayed or brushed on to a floor substrate.

The curing agent composition of the invention contains no added solvents or water when used in powder coating applications. In applications where the curing agent composition is applied wet to a substrate, the curing agent composition is non-aqueous and is either dissolved in solvents or is applied neat. Preferably, some amount of solvent is used in the curing agent composition and in the two component epoxy resin composition to reduce the viscosity of the curing agent and/or the epoxy resin compositions, especially in cold temperature applications. The reduction in viscosity facilitates the handling and application of the composition in various environments. Suitable solvents include alcohols, ketones, esters, ethers of hydrocarbons. Examples of suitable solvents are butanol, methyl isobutyl ketone, toluene, ethylglycol acetate, xylene, benzyl alcohol, phthalic acid esters of monohydric alcohols, e.g. n-butanol, amylalcohol, 2-ethylhexanol, nonanol, benzyl alcohol, gamma -butyrolactone, delta -valerolactone, epsilon -caprolactone, lower and higher molecular weight polyols, e.g. glycerol trimethylol-ethane or -propane, ethyleneglycol, and ethoxylated or propoxylated polyhydric alcohols, either individually or in admixture.

Defoamers, tints, slip agents, thixotropes, etc., are common auxiliary components to most coatings and may be employed in the composition of the present invention. Flow control agents are typically used in amounts ranging from 0.05 to 5 wt. %, based on the combined weight of the epoxy resin and the curing agent composition.

Re-inforcing agents may be added to either of the components, and include natural and synthetic fibers in the form of woven, mat, monofilament, chopped fibers and the like. Other materials for re-inforcing include glass, ceramics, nylon, rayon, cotton, aramid, graphite and combinations thereof. Suitable fillers include inorganic oxides, inorganic carbonates, ceramic microspheres, plastic microspheres, glass microspheres, clays, sand, gravel and combinations thereof. The fillers can be used in amounts suitably from 0 to 100 pbw of the combined epoxy/curing agent components.

Aside from coating applications, the curing agent compositions of the invention and the two component compositions utilizing the curing agents compositions can be used in such applications as flooring, casting, crack or defect repair, molding, adhesives, potting, filament winding, encapsulation, structural and electrical laminates, composites and the like.

A typical use for the two component compositions of the invention is in coatings. The heat-curable coating composition can be applied to a substrate by brush, spray, or rollers. Alternatively, the curing agent compositions can be mixed and dried to a powder for powder coating applications. In the case where the coating is applied wet, the epoxy resin composition is preferably a liquid resin, a semi solid resin, or in solution, at the application temperature. The same is true for the curing agent composition. The two component compositions of the invention are mixed and cured, preferably in the absence of external accelerators in a wide range of temperatures ranging from—25° C. to 100° C. One advantage of the invention is that the curing agent composition of the invention and the epoxy resin can cure, once mixed, within 24 hours at 4.4° C. This is unexpected since many, if not all, of the primary amine groups are reacted out with the monoglycidyl capping agent, thus otherwise lowering the reactivity of the curing agent. For measurement purposes, the two component mixture is "cured" when it cures to a hard gel (cotton free) at the designated temperature in the absence of external accelerators and at 50% or more relative humidity. At 25° C., the curing agent composition of the invention can cure an epoxy resin as quick as 10 hours, even as soon as within 7 hours, depending upon the particular species of curing agent, epoxy resin, and humidity conditions. At lower temperatures, the amount of time required for cure naturally increases, although due to the excellent compatibility between the curing agent composition and the epoxy resin used in the invention, the overall time to cure at any given temperature is dramatically reduced compared to epoxy resins mixed with other types of curing agents.

The curing agent compositions of the invention can also be used in thermosetting powder coating compositions prepared by the various methods known to the powder coating industry: dry blending, melt compounding by two roll mill or extruder and spray drying. Typically the process used is the melt compounding process: dry blending solid ingredients in a planetary mixer and then melt blending the admixture in an extruder at a temperature within the range of about 80° C. to 130° C. The extrudate is then cooled and pulverized into a particulate blend.

The thermosetting powder composition can then be applied directly to a substrate of, e.g., a metal such as steel or aluminum. Non-metallic substrates such as plastics and composites can also be used. Application can be by electrostatic spraying or by use of a fluidized bed. Electrostatic spraying is the preferred method. The coating powder can be applied in a single sweep or in several passes to provide a film thickness after cure of about 2.0 to about 15.0 mils.

The substrate can optionally be preheated prior to application of a powder composition to promote uniform and thicker powder deposition. After application of the powder, the powder-coated substrate is baked, typically at about 120° C., preferably from about 150° C., to about 205° C. for a time sufficient to cure the powder coating composition, typically from about 1 minute to about 60 minutes, preferably from about 10 minutes to about 30 minutes.

The following examples illustrate an embodiment of the invention and are not intended to limit the scope of the invention.

EXAMPLE

SSA is about 63 wt. % salicyclic acid mono substituted with $C_{14}$–$C_{18}$ alkyl groups dissolved in xylene and containing less than 15 mole % of $C_{14}$–$C_{18}$ alkyl phenols and less than 5 mole % of dicarboxylic acid species, having an acid value of about 92 mg KOH/g in solution and about 146 mg KOH/g based on the solids.

TETA is triethylene tetramine commercially available from Union Carbide having a typical amine value of about 1436 mg KOH/g.

HELOXY® Modifier 62 is a commercial grade of ortho-cresyl glycidyl ether manufactured by Shell Chemical Company, that is produced by treatment of ortho-cresol with epichlorohydrin and sodium hydroxide. HELOXY Modifier is a thin liquid having a viscosity at 25° C. of about 7 centipoise and an epoxide equivalent weight of about 175 to about 195.

EPON® 828 is a diglycidyl ether liquid epoxy resin commercially available from Shell Chemical Company.

Example 1

This example illustrates the synthesis of the substituted aryl amidopolyamine compound based on a substituted salicyclic acid and triethylene tetramine, which is subsequently reacted with a monoglycidyl ether.

A 4 necked round-bottomed glass flask was equipped with a condenser having a water trap, a nitrogen inlet, an acid inlet, and the TETA inlet. The flask was flushed with nitrogen. 1529.4 g of SSA was charged to the flask, after which a total of 390.42 grams of TETA was charged over a period of time to the flask, for a total of 1919.8 grams of reaction ingredients. The amount of SSA and TETA added were reacted in a ratio of one amine equivalent to one acid equivalent, or a 1:1 mole ratio. During the course of the reaction through completion, approximately 613 grams of water and xylene were distilled off. In this reaction scheme, the total amount of ingredients were mixed together prior to reaction.

After addition of the SSA was to the flask, TETA was added dropwise at about 23° C. initial, with the contents of the flask being stirred at about 60 rpm under a nitrogen pad, for a period of two hours, during which the exotherm raised the temperature of the reaction mixture to about 50° C. Once addition of the TETA was complete, the temperature of the reactants in the flask was raised to 150° C. slowly over about a 55 minute period, and then raised to 160° C. over the next one and a half hours. The reaction was left overnight at room temperature. The next day, the reaction was again heated to 160° C. for the first two hours, and subsequently warmed to 170° C. over the next 7 hours. To drive the reaction to full completion and the desired acid value, the reactants were again heated to about 145° C.–150° C. over a 5 hour period under vacuum at about 20 in. Hg. The acid value was measured at about 10.3 mg KOH/g, and the amine value was measured to be about 345.4 mg KOH/g.

Once this product was made, 514.82 grams of it was used to react with 198.25 g of the monoglycidyl ether HELOXY® 62. The amounts of each ingredient used were based on reacting them in stoichiometric ratios of one primary amine equivalent to one epoxide equivalent.

The product was charged to a 4 necked round bottomed flask equipped with a condenser. The flask was purged with nitrogen, and agitation was initiated. Once the product was heated to 93° C., the HELOXY® 62 was added dropwise over a period of about 3 hours. The reaction temperature was held at 90–96° C. for the next 30 minutes, after which the final end capped amidopolyamine curing agent was isolated under nitrogen purge using a coarse grade Gardner filter cup. The acid and amine values of the final end capped amidopolyamine product were measured to be 7.6 and 246.4 mg KOH/g, respectively. This curing agent was mixed with solvents to arrive at a curing agent solution having 80 g of the end capped amidopolyamine, 5 g of n-butanol, and 15.64 g of xylene. The percent solids was calculated to be 79.5.

Example 2

This example demonstrates the storage stability of the product made in Example 1. A 120 g sample of the curing agent made in Example 1, without being mixed in solvents, was set in a glass container at ambient temperature for a period of six months without being disturbed except when sampled intermittently for viscosity. The viscosity of the curing agent was measured at one month intervals using a Brookfield viscometer with a spindle 6 and again using a spindle 7 at 20 rpm. For comparison purposes, a 120 g sample of Cardolite NC-541, a commercially available low temperature phenalkamine curing agent having aliphatic polyamines attached to an aromatic backbone with aliphatic side chains, from The Cardolite Corporation, was also sampled monthly over a six month period for changes in viscosity, using a spindle 7 at 20 rpm. The results are tabulated in Table 1 below. The results show a dramatic increase in the viscosity of the Cardolite® sample at one month, with a steady increase thereafter. By contrast, the viscosity of the end capped amidopolyamine curing agent made in Example 1 were fairly constant throughout the six month period, indicating that the product was storage stable, and was not self reacting to form the more viscous higher molecular weight oligomeric species. The results are also a good indicator that the curing agent was resistant to reaction with carbon dioxide and atmospheric water, which often produces the undesirable side effect of blush and soft film formation. By end capping the primary amine groups with the monoglycidyl compound, this undesirable effect can be substantially avoided, and as shown in further examples, the reactivity of the amidopolyamine is quite good even though the primary amine groups have been substantially reacted out with the monoglycidyl compound.

TABLE 1

| Month | Example 1 | Cardolite ®NC-541 |
| --- | --- | --- |
| Initial | 38,800 | 53,800 |
| 1 month | 35,950 | 113,800 |
| 2 months | 38,150 | 117,000 |
| 3 months | 40,250 | 137,400 |
| 4 months | 45,450 | 138,200 |
| 5 months | 55,800 | 151,600 |
| 6 months | 39,400 | 158,600 |

Example 3

This example demonstrates the properties of end capped amidopolyamine curing agent solution made in Example 1 when mixed and reacted with an epoxy resin.

6 g of EPON® 828 epoxy resin were reacted in a 1:1 stoichiometric ratio with 8.54 g of the curing agent solution. Upon mixing, the end capped amidopolyamine was immediately compatible with the epoxy resin as evidenced by the formation of a clear solution upon mixing. Thus, there existed no need for an induction time after mixing the ingredients.

A formula for coating was made consisting of 6.0 g of the EPON® 828 resin, 8.54 g of the end capped amidopolyamine final product in solution made in Example 1, and 0.006 g of BYK 348 flow control agent. Upon mixing, the mixture was dropped onto 4 inch by 6 inch cold roll steel panels, and allowed to cure over 7 days. The film thickness was 1–2 mils, initial specular gloss was 104 at 60° and 102.7 at 20°. On glass panels with cure conditions set at 7 days, 25° C., and 50 RH, the gloss at 60° was 146 and at 20° was 165. On glass panels with cure conditions set at 7 days, 4.4° C., and 50–60% RH, the gloss at 60° C. was 124 and at 20° C. was 118. The impact strength on films cast onto the cold rolled steel was 32 in/lb (direct) and 28 in/lb (indirect), MEK resistance was 35 double rubs, and adhesion was 4A by X-Cut method.

The results indicate that films made with the curing agent of the invention had good impact resistance at ambient cure temperatures, and had good glossy film characteristics. Thus, even though the primary amine groups in the curing agent were capped with a monoglycidyl compound, the curing agent had good reactivity and resulted in films with good impact resistance.

Example 4

In this example, the amidopolyamine capped curing agent solution was mixed with an epoxy resin for examination of the film properties.

33.18 pbw of EPON® Resin 828 was mixed with 33.18 pbw of the curing agent solution made in Example 1 at a stoichiometric ratio of 1:0.707, respectively. The mixture was pigmented with a white pigment and given a 30 minute induction time, although this time was not necessary. The mixture was drawn down with a #50 wire-wound bar on bonderite 1000 steel panel at an average thickness of 2.5 mils. The curing conditions were set for 14 days at 25° C. and 50% RH. The pot life of the mixture was about 6 hours, and the initial mix viscosity was 600 cP. The film became a soft gel (set to touch) at 2 hours, a hard gel (cotton free) at 6.5 hours, and mar resistant (through dry) at 10 hours. At a 24 hour cure, the film had a hardness of 2B; and after 14 days, a hardness of F. Also after the 14 day cure, the direct impact was p16, f20; adhesion X-cut was 5A, flexibility on Mandrel test was 6.35 % elongation, specular gloss was 98.4 at 60° and 85.6 at 20°, and the MEK resistance was 85. The coatings showed very good water resistance properties as evidenced by the maintenance of coating integrity in water immersion tests under ambient (25° C.) and elevated temperatures (60° C.) for 2000 hours.

When cured at 4.4° C. and 70% RH for 14 days, the film had a hardness of 3B. Its cure rate was 6 hours to soft gel, 24 hours to hard gel, and 42 hours to mar resistance.

The results indicate that coatings made with the curing agent of the invention had good reactivity as indicated by their reasonable cure rates, and produced films having excellent hardness at room temperature and good hardness when cured at temperatures as low as 4.4° C. The reactivity of the epoxy resin composition was good in that it cured to a hard gel within 24 hours at the low temperature of 4.4° C., even in the absence of an external accelerator/catalyst. The coating composition exhibited a pot life of about 6 hours even with a highly functional resin such, as EPON® Resin 828, and relatively low coating application viscosity under ambient conditions, thus satisfying two basic requirements for ambient-cure coatings known to those skilled in the art.

Comparative Example

In this example, the phenolic compound substituted with at least one carboxyl group and at least one hydrocarbyl group having at least 1 carbon atom to make the curing agent was not used in preparing the curing agent. Instead, this example illustrates the effects obtained when a tall oil fatty acid (TOFA) is used for reaction with triethylene tetramine along with the monoglycidyl ether as an end cap for comparison.

A four necked round-bottomed glass flask was equipped with a condenser having a water trap, a nitrogen inlet, an acid inlet, and the TETA inlet. The flask was flushed with nitrogen. 690.29 g of the TOFA was charged into the flask, after which a total of 369.48 g. of TETA was charged over a period of time to the flask, for a total of 1059.77 g. of reaction ingredients. The amount of TOFA and TETA added were reacted in a ratio of one amine equivalent to one acid equivalent, or a 1:1 mole ratio.

After addition of TOFA to the flask, TETA was added dropwise at about 23° C. initial, with the contents of the flask being stirred at about 60 rpm under a nitrogen pad, for a period of two hours, during which the exotherm raised the temperature of the reaction mixture to about 50° C. Once addition of the TETA was complete, the temperature of the reactants in the flask was raised to 150° C. slowly over about a 55 minute period, and then raised to 160° C. over the next one and a half hours. The reaction was left overnight at room temperature. The next day, the reaction was again heated to 160° C. for the first two hours, and subsequently warmed to 170° C. over the next 7 hours. To drive the reaction to full completion and the desired acid value, the reactants were again heated to about 145° C.–150° C. over a 5 hour period under vacuum at about 20 in. Hg. The acid value was measured at about 4.93 mg KOH/g.

Once this product was made, it was further reacted with 186.25 g of the monoglycidyl ether HELOXY® 62. The amounts of each ingredient used were based on reacting them in stoichiometric ratios of one primary amine equivalent to one epoxide equivalent. At 93° C., the HELOXY® 62 was added dropwise over a period of about 3 hours. The reaction temperature was held at 90–96° C. for the next 30 minutes, after which the final end capped amidopolyamine curing agent was isolated.

The acid and amine values of the final end capped amidopolyamine product were measured to be 3.04 and 272.6 mg KOH/g, respectively. This curing agent was mixed with solvents to arrive at a curing agent solution having 80 g of the end capped amidopolyamine, 5 g of n-butanol, and 15.64 g of xylene. The percent solids was calculated to be 78.87.

This comparative product and the product from example 1 were both tested in a clear lacquer formulation. The final results are shown in Table 2. The curing agents were both mixed at a stoichiometric ratio of 1:1 with EPON resin 828 in the amounts shown in the table and tested after 7 days cure at 25° C./50% RH and 5° C./85% RH.

TABLE 2

| Run Number | 1 | 2 | 3 | 4 |
|---|---|---|---|---|
| Curing Agent | Comp. Ex. 1 | Comp. Ex. 1 | Ex. 1 | Ex. 1 |
| Epoxide Resin (E) Epon ® 828 | 42.14 g | | 40.11 g | |
| Curing Agent (C) 80% | 57.86 | | 59.89 | |
| Stoichiometric Ratio, (E/C) | 1:1 | | 1:1 | |
| Induction time (min) | 30 min | | 30 min | |
| Cure conditions | 25 C/50% | 5 C/80% | 25 C/50% | 5 C/80% |
| Mix viscosity, KU | 900 cP | | 1125 cP | |

TABLE 2-continued

| Run Number | 1 | 2 | 3 | 4 |
|---|---|---|---|---|
| Properties after 24-hour cure | | | | |
| Film hardness | 5B | <6B | 5B | <6B |
| Film cure rate (hours) | | | | |
| Soft gel (set-to-touch) | 5 | 2 | 3 | 7 |
| Hard gel (cotton-free) | 9.5 | >24 | 4.5 | 17 |
| Mar resistant (thru-dry) | 13 | — | 7.5 | >24 |
| Specular Gloss | | | | |
| 60 degrees (avg) | 102.2 | 71.2 | 102.3 | 95.3 |
| 20 degrees (avg) | 92.3 | 30.8 | 99.6 | 93 |
| Properties after 3 days | | | | |
| Film hardness | 2B | <6B | 4B | <6B |
| Specular Gloss | | | | |
| 60 degrees (avg) | 99.0 | 70.1 | 102.4 | 97.0 |
| 20 degrees (avg) | 87.0 | 28.0 | 100.2 | 80.5 |
| Properties after 7-day cure | | | | |
| Film hardness | 2B | <6B | 3B | 4B |
| Direct impact, in/lb | 100P | 4P | 36P | 32P |
| Reverse impact, in/lb | 12P | 4F | 12P | 8P |
| Adhesion, X-cut | 5A | 5A | 0A | 0A |
| MIBK resistance, min. | 5 | — | 5 | 5 |
| MEK double rubs | 42 | 2 | 18 | 7 |
| Specular gloss | | | | |
| 60 degrees | 96.0 | 61.8 | 102.1 | 91.4 |
| 20 degrees | 82.4 | 22.1 | 99.5 | 72.8 |

The results indicate that the curing agent of Example 1, based on SSA and TETA, outperformed the comparative example based on the TOFA/TETA adduct in reactivity. The SSA/TETA curing agent of Example 1 cured at room temperature within 8 hours, whereas the comparative TOFA/TETA curing agent took 13 hours to cure. The disparity is more pronounced when the epoxy resins are cured with the curing agents at 5° C. and 85% RH. At this environmental condition, the TOFA/TETA curing agent failed to cure the epoxy resin and remained sticky, while the SSA/TETA curing agent of Example 1 gave a hard gel after 17 hrs.

The appearance of cured films made with the curing agent of Example 1 was also improved over the appearance of the cured films made with the comparative example curing agent as demonstrated by the measured difference in gloss value.

What we claim is:

1. A two component solventborne or solventless epoxy composition comprising an epoxy resin component and a curing agent component, said curing agent component comprising the reaction product of:

b) a substituted aryl amidopolyamine comprising the reaction product of:
bi) a phenolic compound substituted with at least one carboxyl group and at least one hydrocarbyl group having at least 8 carbon atoms, and
bii) an aliphatic polyamine compound having at least two primary amine group, and
c) a monoglycidyl capping agent.

2. The compound of claim 1, wherein the composition is curable within 24 hours at 4.4° C. in the absence of external accelerator compounds.

3. The compound of claim 2, wherein the composition is in the absence of external accelerators.

4. The compound of claim 3, wherein the polyamine compound further contains at least one secondary amine group, and the phenolic compound is salicyclic acid is substituted with a 14 to 24 carbon alkyl group.

5. The compound of claim 4, wherein at least one mole of polyamine is reacted per carboxyl group equivalent on the phenolic compound.

6. The compound of claim 4, wherein the polyamine compound comprises diethylene triamine, triethylene tetramine, tetraethylenepentamine, or m-xylylene diamine.

7. The compound of claim 1, wherein the monoglycidyl capping agent comprises an alkyl glycidyl ether having 1–24 branched or unbranched carbon atoms in the alkyl chain, an alkaryl glycidyl ether, an aryl glycidyl ether, an allyl glycidyl ether, an alicyclic alkyl glycidyl ether, or a glycidyl ester of a monocarboxylic acid.

8. The compound of claim 7, wherein the monoglycidyl capping agent comprises an alkyl glycidyl ether having 2–18 carbon atoms or an alkaryl glycidyl ether wherein the alkyl has 1–24 carbon atoms.

9. The compound of claim 7, wherein the monoglycidyl ether comprises butyl glycidyl ether, cresyl glycidyl ether, phenyl glycidyl ether, nonylphenyl glycidyl ether, p-tert-butyl glycidyl ether, or an alkyl glycidyl ether having 8–16 branched or unbranched alkyl carbon atoms.

10. The compound of claim 1, wherein the monoglycidyl capping agent is reacted with the aryl amidopolyamine compound at a molar ratio of about 0.5:1 to 2:1, respectively.

11. The compound of claim 1, wherein the curing agent is liquid at 25° C.

12. The curing agent of claim 1, wherein the carboxyl group on the phenolic compound comprises a -carboxy acid, an -acetic acid, a -propionic acid, or a -stearic acid.

13. The curing agent of claim 12, wherein the phenolic compound comprises an 8–24 carbon alkyl substituted salicyclic acid, the polyamine compound comprises at least two primary amine nitrogens and at least on secondary amine nitrogen, and the monoglycidyl ether comprises an alkyl glycidyl ether having 2–18 carbon atoms or an alkaryl glycidyl ether wherein the alkyl has 1–24 carbon atoms.

* * * * *